UNITED STATES PATENT OFFICE.

HENRY S. BLACKMORE, OF MOUNT VERNON, NEW YORK.

MANUFACTURE OF SODIUM.

SPECIFICATION forming part of Letters Patent No. 391,110, dated October 16, 1888.

Application filed April 28, 1888. Serial No. 272,148. (No specimens.)

*To all whom it may concern:*

Be it known that I, HENRY S. BLACKMORE, of Mount Vernon, in the county of Westchester and State of New York, have invented a new and Improved Process for the Manufacture of Sodium, of which the following is a full, clear, and exact description.

My invention consists in intimately mixing about twenty-seven and one-half ($27\frac{1}{2}$) pounds of calcium hydrate, $Ca(OH_2)$; thirty-one and one-tenth ($31\frac{1}{10}$) pounds of ferric or ferroso-ferric oxides, or a mixture of both; thirty and nine-tenths ($30\frac{9}{10}$) pounds of sodium carbonate (dry), and ten and one-half ($10\frac{1}{2}$) pounds of carbon in the form of charcoal, coal-dust, bitumen, coal-tar, or other carbonaceous matter. This mixture is then placed in an iron cylinder and gradually heated in a furnace until it attains a low-red heat, at which temperature it is kept for from fifteen to twenty minutes. The heat is then raised until the cylinder is white-hot. The metallic sodium in the form of vapor then escapes through a delivery-tube into a receiver, where it is condensed, while the carbonic oxide and hydrogen gases, which also escape at the same time, are allowed to pass on out of a vent, where they are burned.

The above weights are only given as examples, and I do not follow them strictly, as when more of the ferroso-ferric oxide is present than ferric a less amount of the mixture of the oxides is required and an additional amount of carbon or carbonaceous matter, &c. The weights have also to be varied more or less for good or poor material.

The calcium hydroxide (hydrate $Ca(OH_2)$) acts upon the sodium carbonate ($Na_2Co_3$) at a low heat, forming calcium carbonate and sodium hydroxide (NaOH). As the heat is raised the carbon or carbonaceous matter present decomposes the calcium carbonate, forming calcium oxide (CaO) or quicklime and carbonic oxide, which, being a gas, passes off. The carbon or carbonaceous matter at the same time also decomposes the ferric and ferroso-ferric oxides present, forming metallic iron and carbonic oxide. The nascent metallic iron in its finely-divided state then immediately unites with the oxygen of the sodium hydroxide (NaOH), forming the oxides of iron and setting free hydrogen gas and metallic sodium, which pass off in the form of vapor. The metallic sodium, having been thus driven off along with the hydrogen and carbonic oxide, the residue consists of calcium oxide (CaO) or quicklime mixed with ferric and ferroso-ferric oxides. This has only to be mixed with water, which again forms the calcium hydroxide ($Ca(OH_2)$). The ferric and ferroso-ferric oxides being present, all that is necessary for another charge is to mix it with the requisite amount of sodium carbonate (dry) and carbon, bitumen, coal-tar, or other carbonaceous matter.

The iron in this process acts merely as a carrier of oxygen from the sodium hydroxide to the carbon. This can be proved by the iron existing in nearly the same state at the end of the process as when it was started—that is, if too much carbon has not been used—in which case the iron oxides are more or less reduced to the metallic state, the only difference being, perhaps, a little more of the ferroso-ferric oxides than ferric, or vice versa. There may possibly be a few other chemical compounds formed in this process, but they are of minor importance, and do not tend to aid or retard the process the slightest.

It is quite preferable to use some hydrocarbon or mixture of hydrocarbons—such as bitumen, coal-tar, &c.—in this process, inasmuch as they not only aid in decomposition, &c., but the lighter hydrocarbon products, volatilizing and distilling over with the sodium, serve to protect it from oxidation, which often takes place, even with the greatest care.

Sodium has been manufactured from sodium hydroxide by the action of metallic iron with the aid of heat; but in that process the sodium hydroxide has to be made and then separated from waste products. It is then mixed with iron filings or turnings, &c., and fused. The difficulty in this process seems to be that the sodium hydroxide fuses and becomes liquid at a heat sufficient to decompose it. The iron, having a greater specific gravity, naturally sinks to the bottom, and thus retards the process. In my process all this difficulty is obviated. First, the sodium hydroxide is formed and decomposed all at the same time, thus economizing the time which other processes take up dissolving out, evaporating, and fusing; secondly, the ferric and ferroso-ferric oxides, being of less specific gravity than metallic iron, they do not settle down so easily, and the calcium oxide and carbon or carbonaceous matter present tend to hold the oxides in suspension; thirdly, the iron oxides, being decomposed in the mixture, leave the nascent iron in a finely-divided and thoroughly-mixed state, thus rendering the decomposition of the sodium hydroxide more thorough and perfect. Still further, the waste products or residue has only to be mixed with a little water in order to slake the calcium oxide, and I have the calcium hydroxide and iron oxides mixed in the same proportions as when I started the process, all else necessary, after drying, being to add the requisite amount of dry sodium carbonate and carbon or carbonaceous matter and proceed as before. Thus we see that the iron oxides and calcium salts may be used over and over again with but little loss.

Having thus described my invention, what I claim as new, and desire to secure by Letters Patent, is—

The method herein described of making sodium, which consists in mixing together calcium hydrate, ferric oxide, sodium carbonate, and carbon, heating the same in a chamber, and collecting and condensing the vapors, substantially as described.

HENRY S. BLACKMORE.

Witnesses:
HARRY V. MORGAN,
JOHN A. McINTOSH.